Sept. 2, 1924.
L. W. MARBLE
1,507,079
VIGNETTING ATTACHMENT FOR CAMERAS
Original Filed March 9, 1921
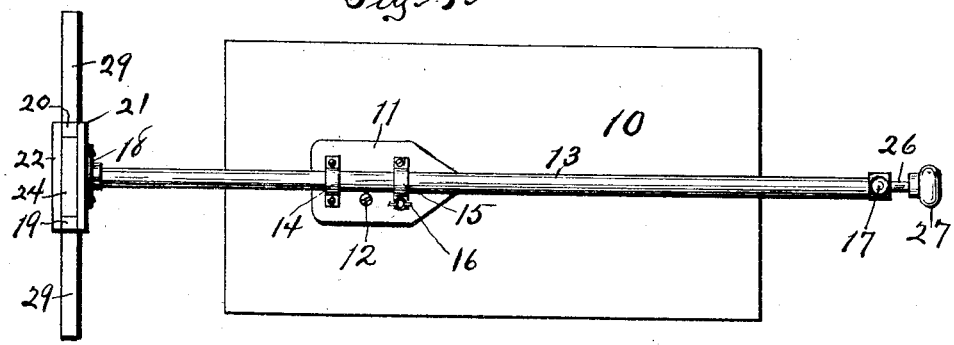
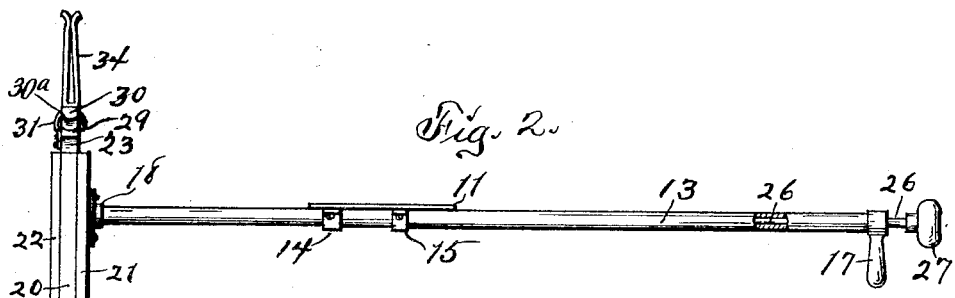
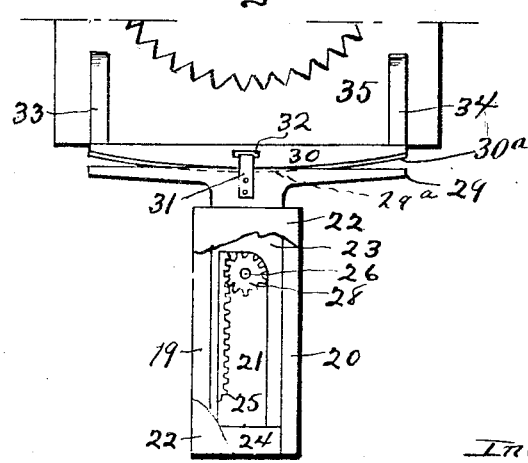
Inventor:
Lewis W. Marble
By Silas C. Swert
Atty Patented Sept. 2, 1924.

1,507,079

UNITED STATES PATENT OFFICE.

LEWIS W. MARBLE, OF MARENGO, IOWA; HATTIE E. MARBLE ADMINISTRATRIX OF SAID LEWIS W. MARBLE, DECEASED.

VIGNETTING ATTACHMENT FOR CAMERAS.

Application filed March 9, 1921, Serial No. 451,061. Renewed February 1, 1924.

*To all whom it may concern:*

Be it known that I, LEWIS W. MARBLE, a citizen of the United States of America, and resident of Marengo, Iowa County, Iowa, have invented a new and useful Vignetting Attachment for Cameras, of which the following is a specification.

The object of this invention is to provide means for mounting a vignetter or vignetting card or plate adjustably on and relative to the box or housing of a camera used in photography.

A further object of this invention is to provide means for adjusting a vignetter relative to the housing or box of a photographic camera.

A further object of this invention is to provide means for automatically maintaining a desired position of a vignetter or returning the same to such position upon release of manual or other control thereof.

My invention consists in the construction, arrangement and combination of elements hereinafter set forth, pointed out in my claims and illustrated by the accompanying drawing in which—

Figure 1 is a bottom plan showing my improved devices mounted on a camera housing as required for practical use. Figure 2 is a side elevation of the same, the housing being omitted. Figure 3 is a front end elevation, of the device shown in Figure 2, parts being broken away.

In the construction of the device as shown the numeral 10 designates a housing or box of a camera used in photography, shown conventionally. A plate 11 is arranged parallel with and secured pivotally to the bottom of the housing 10 by means of a screw 12. A tube 13 is mounted longitudinally on and parallel with the plate 11 and projects therefrom at both ends. The tube 13 is arranged for rectilinear reciprocation and rotary oscillation relative to the plate 11, being secured to said plate by two parallel clips 14, 15 attached to the plate by screws in each end, one of the screws having a wing nut 16 adapted for manipulation to apply tension or friction to the tube. A handle 17 is fixed to and depends from one end portion of the tube 13 and is adapted for manipulation to oscillate the tube on the axis of the screw 12 or in the clips or to reciprocate said tube in said clips. A flanged collar 18 is fixed to the forward end portion of the tube 13 and a vertical guide, built up of side bars 19, 20, a back plate 21 and a front plate 22, open at both ends, is fixed by means of its back plate 21 to and is supported by the collar. The guide and members carried thereby may be oscillated with and by the tube 13. A stem 23 is mounted for vertical reciprocation in the guide and fitted loosely thereto and the major portion of said stem is formed as a fork open at its lower end, and abutting at times on a weight 24 mounted in the lower end of the guide. It is the function of the weight to hold or return the guide to vertical position after it has been oscillated out of a vertical position by manipulation of the tube 13. One arm of the fork of the stem 22 is formed with a rack 25 directed toward the median line of the stem. A rod 26 is pivotally mounted in the tube 13 and fits snugly to and frictionally engages said tube and is formed with a knob 27 on its rear end and a spur gear 28 on its forward end, which gear is in mesh with the rack 25 and lies in the fork of the stem 23. A cross-head 29 is formed on the upper end of the stem 23 and is formed with a concaved groove 29$^a$ in its upper surface. A rocker 30, formed with a convex lower face 30$^a$, both longitudinally and transversely, is mounted on the cross-head 29 and coacts with the groove therein. A leaf spring 31 is fixed to the cross-head 29, is curved and extends through a slot or angular oblong hole 32 formed horizontally through the central portion of the rocker 30. It is the function of the spring 31 to hold the rocker on the cross-head 29 in any position in which it may be placed manually. Yokes 33, 34 are mounted on and rise from end portions of the rocker 30 and are adapted to receive and support removably and replaceably a card or plate 35, of desired form, employed as a vignetter or for vignetting purposes.

In practical use the card or plate 35 may be oscillated manually on an axis transversely of the housing 10 by manipulation of the rocker 30 under tension of the spring 31. Also the card or plate 35 may be raised and lowered by manipulation of the rod 26 in the tube to the end of causing the gear 28 to operate the rack and stem in either direction. Also the card or plate 35 may be swung through an arc on the axis of the screw 12 by later manual oscillation of the tube 13. Also the card or plate 35 may be oscillated on a horizontal axis by horizontal rotary manipulation of the tube 13. Thus is provision made for adjusting the card or plate 35 in any desired manner relative to the lens of the camera, the means for adjustment being in the main located at the rear of and below the housing 10 within convenient reach of the photographer.

I do not desire to be limited to the construction and arrangement shown, since the same may be modified in many particulars without departing from my invention defined by the appended claims.

I claim as my invention—

1. A vignetting attachment for cameras, comprising a suitable support, a tube mounted for oscillation on an axis perpendicular to said support and also for oscillation and rectilinear reciprocation on an axis parallel with and longitudinally of said support, a guide carried by said tube, a stem mounted for vertical reciprocation in said guide, a rod in said tube adapted for manual oscillation relative thereto, a rack and gear connection between said stem and rod, a holder on said stem, and adjusting means between said holder and stem.

2. A vignetting attachment for cameras, comprising a suitable support, a tube mounted for oscillation on an axis perpendicular to said support and also for oscillation and rectilinear reciprocation on an axis parallel with and longitudinally of said support, a guide carried by said tube, a stem mounted for vertical reciprocation in said guide, a rod in said tube adapted for manual oscillation relative thereto, a rack and gear connection between said stem and rod, a cross-head being formed on said stem, a rocker adjustably mounted on said cross-head, and a vignetting plate removably and replaceably carried by said rocker.

3. A vignetting attachment for cameras, comprising a suitable support, a tube mounted for oscillation on an axis perpendicular to said support and also for oscillation and rectilinear reciprocation relative to said support, a guide carried by said tube, a stem mounted for vertical reciprocation in said guide, a rod in said tube adapted for manual oscillation relative thereto, a rack and gear connection between said stem and rod, a cross-head being formed on said stem, a rocker mounted on said cross-head and formed with a slot, a yielding pressure device fixed to said cross-head engaging said slot, and a vignetting plate removably and replaceably carried by said rocker.

Signed at Marengo, in the county of Iowa and State of Iowa, this 1st day of March, 1921.

LEWIS W. MARBLE.